United States Patent [19]

Foldesi

[11] Patent Number: 4,719,739
[45] Date of Patent: Jan. 19, 1988

[54] CONTINUOUS MOTION IN-LINE SEALER

[75] Inventor: Istvan Foldesi, Laval, Canada

[73] Assignee: Montreal Milling Cutter Company, Inc., Quebec, Canada

[21] Appl. No.: 907,938

[22] Filed: Sep. 16, 1986

[51] Int. Cl.$^4$ .............................................. B65B 7/28
[52] U.S. Cl. ......................................... 53/306; 53/298
[58] Field of Search ................. 53/287, 296, 298, 306, 53/308, 329, 334

[56] References Cited

U.S. PATENT DOCUMENTS

| | | | |
|---|---|---|---|
| 1,785,235 | 12/1930 | Turner | 53/296 |
| 1,951,936 | 3/1934 | Jorgensen | 53/296 |
| 2,196,209 | 4/1940 | Glunz | 53/296 |
| 2,658,655 | 11/1953 | Litchfield et al. | 53/306 |
| 2,662,498 | 12/1953 | Johnson | 53/296 |
| 3,629,989 | 12/1971 | Reinecke | 53/306 |
| 3,755,987 | 9/1973 | Dardaine et al. | 53/296 |
| 3,792,566 | 2/1974 | Kinney | 53/298 |
| 4,205,502 | 6/1980 | Ahlers | 53/308 |
| 4,282,698 | 8/1981 | Zimmermann | 53/298 |
| 4,362,002 | 12/1982 | Rowland et al. | 53/478 |
| 4,437,289 | 3/1984 | Bedin | 53/308 |

Primary Examiner—Robert L. Spruill
Assistant Examiner—Donald R. Studebaker
Attorney, Agent, or Firm—Jones, Tullar & Cooper

[57] ABSTRACT

A continuous motion in line sealer assembly includes a sealer star wheel which is coordinated with a plurality of rotatable and receiprocable vacuum heads. Each vacuum head obtains a flexible foil sealing disk from a point of supply and positions the disk atop a container. The vacuum head and container then pass through an induction tunnel to activate a heatable adhesive. A pair of stationary cam plates control both the reciprocal motion of the vacuum head as well as providing it with a dwell time which momentarily interrupts its continuous motion to facilitate sealing disk acquisition.

20 Claims, 6 Drawing Figures

FIG.5
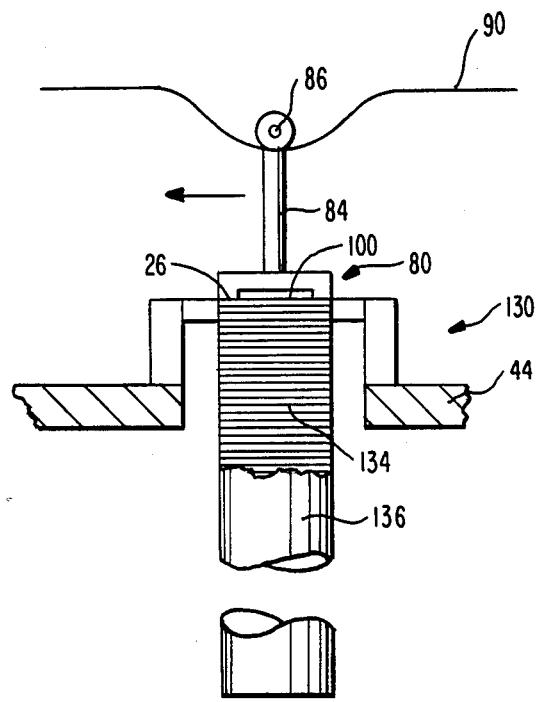
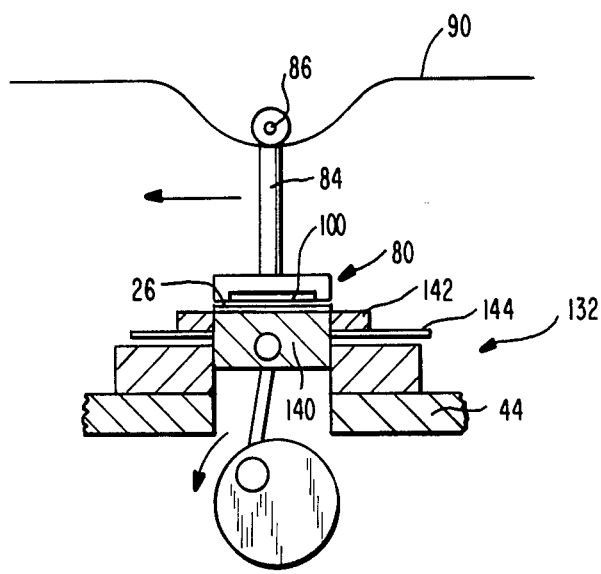
FIG.6

CONTINUOUS MOTION IN-LINE SEALER

FIELD OF THE INVENTION

The present invention is directed generally to a continuous motion in-line sealer. More particularly, the present invention is directed to a continuous motion in-line sealer for applying sealing disks to container mouths. Most specifically, the present invention is directed to a continuous motion in-line sealer utilizing fixed cam plates and reciprocating vacuum actuated sealing heads to apply flexible foil sealing disks to container mouths. A lower, lobed cam plate dictates the angular positioning of vacuum head positioning arms which carry the vacuum actuated sealing disk transfer and hold down heads. These vacuum heads are vertically reciprocated by rods having cam followers that roll in a cam slot in a fixed upper slotted cam plate. The vacuum head positioning arms are caused to rotate concurrently with a sealer star wheel that receives the containers to be filled from an infeed star wheel The continuous in-line sealer of the present invention facilitates continuous, rapid, accurate application of sealing disks to container mouths.

DESCRIPTION OF THE PRIOR ART

It is generally well known in the art to utilize flexible foil sealing disks which are applied across the open mouth of a filled container and which are then sealed in place by various means. Such foil sealing disks have gained increased customer acceptance and desirability since they provide tamper evident capability as well as a means to further protect the container's contents from spoilage or deterioration.

Various machines have been utilized to apply these flexible foil sealing disks to container mouths. These machines may also form the sealing disks from a continuous web of foil and may further include sealing stations as well as sealing disk applying stations. A pair of such devices for forming and attaching a flexible foil sealing disk to a container are set forth in applicant's prior U.S. patent application Ser. No. 771,933, filed Sept. 3, 1985, and assigned to a common assignee. In both of these prior sealing disk applying devices, the motion of the containers being sealed, and of the seal applying head or heads can be characterized as intermittent. Each container must come to a stop for a period of time sufficient to allow the stationary foil sealing disk applying head to place a sealing disk on the container mouth. This requires specifically structure timing screws, somewhat complex controls, the various drive means that are amenable to extremely frequent stops and starts.

Intermittent sealing disk applying machines have a rather low upper limit on the speeds at which they can operate and thus have limited production capacities. Each sealing disk application step requires the container to pause on its forward travel. No matter how efficient the machine is at actually adhering the foil sealing disk to the container mouth, it cannot be any faster than is dictated by its essentially limiting feature; i.e., it must stop and start for each seal disk application.

Intermittent seal disk applying machines, in addition to having an upper production limit which is too low for many applications, also are more prone to container breakage or upset than are other types of assemblies. These intermittent machines are not apt to be overly smooth in operation since they must continually start and stop. Each such change in container movement speed increases the possibility of container damage or spillage. Thus the prior art intermittent sealing disk applying machines are apt to create additional maintenance and clean up requirements.

As production speeds increase and capacity requirements expand, the prior art intermittent sealing disk applying machines have not been able to keep up. While these devices satisfy certain needs in the sealing industry, there is a need for a continuous in-line sealer which will be able to overcome the limitations of prior art devices and which will provide the production capacity required by modern industry. The continuous motion in-line sealer in accordance with the present invention satisfies these requirements and does so in an efficient, dependable manner.

SUMMARY OF THE INVENTION

It is an object of the present invention to provide a continuous motion in-line sealer.

Another object of the present invention is to provide a continuous motion flexible foil sealing disk applying assembly.

A further object of the present invention is to provide a continuous motion in-line sealing assembly utilizing vertically reciprocable vacuum heads.

Yet another object of the present invention is to provide a continuous motion in-line sealing assembly which utilizes fixed cam plates to control vacuum head motion.

Still a further object of the present invention is to provide a continuous motion in-line sealer having resilient vacuum heads.

Even yet another object of the present invention is to provide a continuous motion in-line sealer having an induction field for heating the sealing disks.

As will be set forth in greater detail in the description of the preferred embodiment, the continuous motion in-line sealer in accordance with the present invention utilizes a pair of spaced, fixed cam plates and a plurality of vertically reciprocable vacuum heads to continually take flexible foil sealing disks from a supply point, apply the disks to continually moving containers, hold the disks in place atop the container during passage through a sealing induction tunnel, and release the vacuum heads from the sealed container. Each vacuum actuated head thus both transfers a sealing disk from a point of supply to a container mouth, and holds the disk in place during heat sealing.

During the entire process, each of the vacuum heads is in continual motion with this motion being coordinated to the motion of the sealer's star wheel. The continuous motion of the sealer in accordance with the present invention accomplishes the several beneficial results of increased production speed and hence increased capacity, as well as a reduced possibility of container damage or spillage. The sealing assembly operates in a smooth, continuous manner so that there are no rapid starts or stops as was a characteristic of prior art devices. This absence of numerous starts and stops makes the continuous motion in-line sealer much less prone to maintenance problems since the destructive jarring caused by the intermittent motion of the prior art assemblies is absent in the subject device.

The continuous motion in-line sealer of the present invention maintains accurate registration of the vacuum heads and containers to be sealed by securing both the sealer star wheel and the vacuum head drive hub to the same central drive sleeve. This insures that the vacuum head carrying arms do not move out of alignment with the container transporting apertures in the sealer star wheel. When a vacuum head picks up a flexible foil sealing disk from the supply point and applies it to the container, the alignment is correct and stays correct. This results in a very low number of improperly placed sealing disks so that very few of the containers have to be manually removed at inspection points for re-sealing. Further, since the vacuum heads travel with the containers during passage through the sealing induction tunnel, there is not apt to be any seal disk slippage during sealing. This further reduces the possibility of improper seal attachment or securement.

The continuous motion in-line sealer in accordance with the present invention combines smooth operation and high productivity with uncomplicated structure and operational characteristics. The result is a flexible foil sealing disk applying apparatus that is able to continually secure sealing disks to container at a rapid pace while being free of the intermittent motions related problems that have been characteristic of prior art devices. Thus the continuous motion in-line sealer of the present invention constitutes a substantial and beneficial improvement in the art.

BRIEF DESCRIPTION OF THE DRAWINGS

While the novel features of the continuous motion, in-line sealer in accordance with the present invention are set forth with particularity in the appended claims, a full and complete understanding of the invention may be had by referring to the detailed description of the preferred embodiment as is set forth hereinafter, and as may be seen in the accompanying drawings in which:

FIG. 5 is a schematic side view, partly in section of a stacked seal disk supply assembly; and FIG. 6 is a schematic side view, partly in section of a die set supply assembly.

DESCRIPTION OF THE PREFERRED EMBODIMENT

Figure 1:
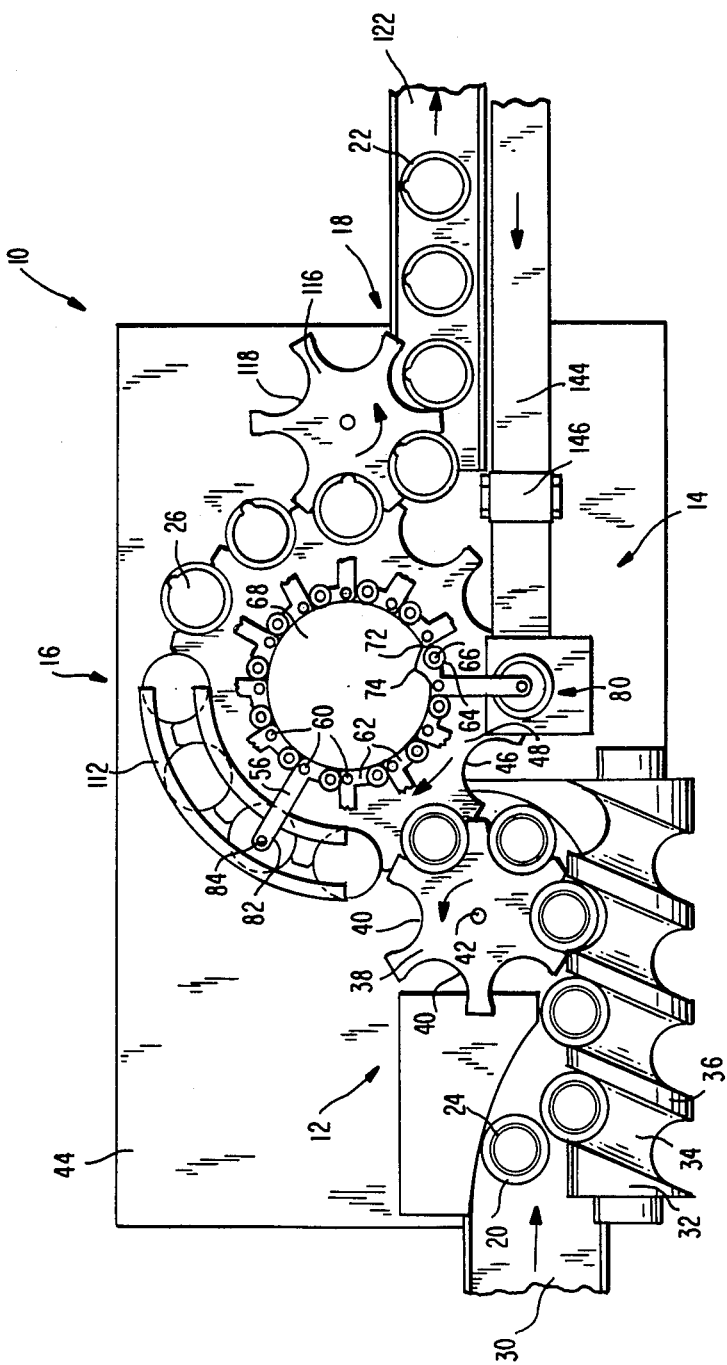
FIG. 1 is a top plan view of a continuous motion, in-line sealer in accordance with the present invention with the upper slotted cam plate removed for clarity.
Figure 2:
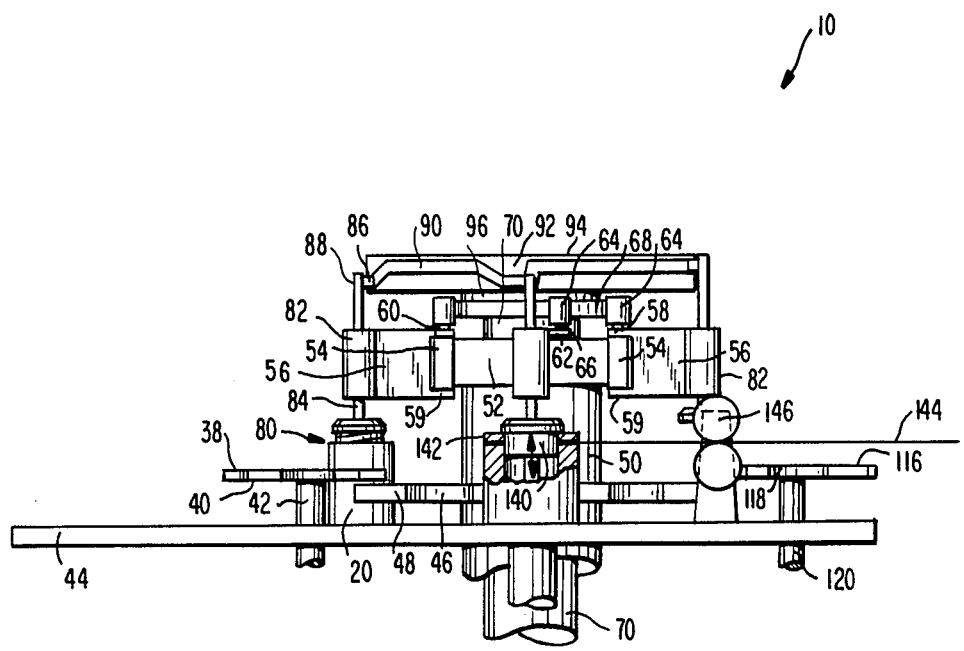
FIG. 2 is a side elevation view, partly in section of the sealer of FIG. 1 with the container infeed lead screw removed for clarity.

Turning initially to FIGS. 1 and 2 there may be seen generally at 10, a preferred embodiment of a continuous motion in-line sealer in accordance with the present invention. Sealer assembly 10 is comprised generally of four interrelated and cooperating segments. These are an infeed lead screw and star wheel, generally at 12; a sealing disk supply means, generally at 14; a continuous motion seal applying and heating assembly, generally at 16; and an outfeed star wheel and conveyor, generally at 18. As will be discussed in greater detail shortly, these four segments of the continuous motion in-line sealer in accordance with the present invention cooperate to receive unsealed containers 20 and to continuously turn out sealed containers 22 whose previously open mouth portions 24 have been sealed with heat activated flexible foil sealing disks 26. These sealing disks are supplied at the sealing disk supply means 14 and are applied to the mouths 24 of the containers 20 as these containers pass in a continuous manner through the continuous motion seal applying and heating assembly 16 of the present invention.

Again referring to FIG. 1, a continuous stream of unsealed containers 20 is delivered to the continuous motion in-line sealer 10 via an infeed conveyor 30. The particular structure of infeed conveyor 30 is not important so long as it delivers the unsealed containers 20 in an appropriate manner. A helical lead screw 32 receives the unsealed containers from infeed conveyor 30 and spaces them in the lands 34 between the screw threads 36. The containers 20, which have now been properly spaced by the lead screw 32, are delivered to an infeed star wheel 38 and are received in infeed pockets 40 of infeed star wheel 38. As may be seen in FIG. 1, infeed star wheel 38 rotates in a counterclockwise direction and is driven by a general vertical infeed star wheel drive stub shaft 42. This drive stub shaft 42 may also be seen in FIG. 2 as extending upwardly through the machine's top plate 44. No specific drive means is shown for infeed star wheel drive stub shaft 42, but it will be understood that the drive means is conventional and is coordinated with the various other drives, as will be discussed shortly.

Unsealed containers 20 are taken over from pockets 40 of infeed star wheel 38 by cooperating and coordinated pockets 46 of a sealer star wheel 48. This main, sealer star wheel 48 rotates about a generally vertical axis that is generally parallel to the axis of rotation of infeed star wheel; 38 but in a clockwise direction, as shown in FIG. 1. Sealer star wheel 48 is securely affixed to a sealer star wheel drive sleeve 50 which, as is shown in FIG. 2, also passes through machine top plate 44 and is driven by a drive means, not shown.

A vacuum head drive hub 52 is secured to an upper portion of sealer star wheel drive sleeve 50. This drive hub 52 carries a plurality of spaced, radially outwardly extending, drive projection 54. A vacuum head positioning arm 56 having inboard upper and lower yoke ends 58 and 59, respectively is secured to each drive projection 54 by passage of a hinge pin 60 through aligned bores in the upper and lower yoke ends 58, 59 and in the drive projection 54 which is located intermediate the yoke ends 58, 59. Thus each vacuum head positioning arm 56 is free to pivot on hinge pin 60 about its drive projection 54 of vacuum head drive hub 52.

An offset vacuum head positioning finger 62 extends from upper yoke end 58 of each vacuum head positioning arm 54 in a generally horizontal direction and generally perpendicular to the plane of the vacuum head positioning arm 54. Each such offset finger 62 carries a roller cam plate follower 64 which is free to rotate on a cam roller shaft 66 that extends upwardly from the free end of each offset vacuum head positioning finger 56. These roller cam plate followers 64 ride on the outer surface of a stationary, lower lobed cam plate 68. Lobed cam plate 68 is secured atop a central stationary hub 70 about which sealer star wheel drive sleeve 50 is rotatably carried. Thus as the sealer star wheel drive sleeve 50 rotates and causes sealer star wheel 48 and vacuum head drive hub 52 to rotate; the roller cam plate followers 64, which are carried by the offset fingers 62 of arms 56 that are attached to drive hub projection 54, track around the periphery of stationary lower lobed cam plate 68. Lobed cam plate 68 includes, as may be seen in FIG. 1, a shaped dwell lobe 72 and adjacent dwell recess 74 whose functions will be discussed in greater detail subsequently.

A vacuum head, generally at 80, is mounted for vertical reciprocation at an outboard end 82 of each vacuum head positioning arm 56. Each vacuum head 80 attached to the lower end of a hollow vacuum head reciprocating rod 84 which slidably passes through a generally vertical bore in the outboard end 82 of each vacuum head positioning arm 56. A cam slot follower 86 is attached to an upper end 88 of each vacuum head reciprocating rod 84. Each cam slot follower 86 rides in a cam slot 90 that is formed in the peripheral surface 92 of an upper, stationary slotted cam disk 94. This upper cam disk 94 is secured atop stationary lower lobed cam plate 68 and is spaced therefrom by a spacer hub 96. It may now be seen that as the sealer star wheel 48 is rotated by sealer star wheel drive sleeve 50, the vacuum head positioning arms 56 will drive the vacuum heads 84 about a circular path in a fixed circumferential position with respect to the sealer star wheel pockets 46. Each vacuum head 80 will further be caused to reciprocate vertically and will follow the shape of cam slot 90 through cam slot follower 86 and vacuum head reciprocating rod 84.

Figure 3:
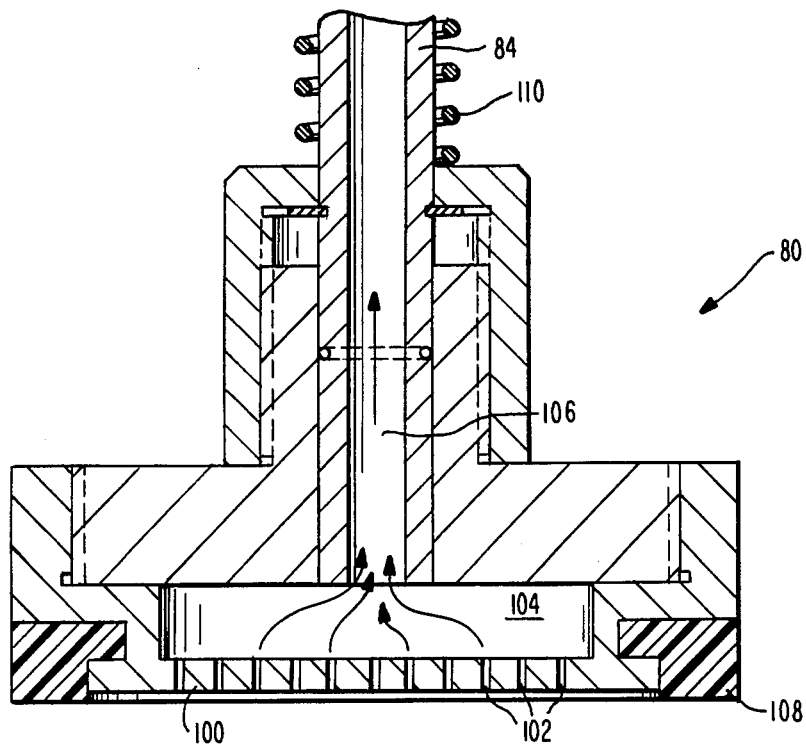
FIG. 3 is a sectional view of a vacuum actuated sealing disk transfer and hold down head in accordance with the present invention.

Turning now to FIG. 3, the vacuum head, generally at 80, may be seen in greater detail. Each vacuum head 80 includes an apertured lower central vacuum plate 100 which includes a group of vacuum apertures 102 that are in fluid communication with a vacuum plenum chamber 104. This plenum 104 is, in turn, supplied with negative pressure through a vacuum conduit 106 in the hollow vacuum head reciprocating rod 84. Although not specifically shown, it will be understood that either positive or negative fluid pressure can be supplied to plenum chamber 104 through conduit 106 in a generally conventional manner. An annular band or ring 108 of resilient material such as silicone or any other heat resistant soft material is secured to the vacuum head 80 about the periphery of central vacuum plate 100. As may be seen in FIG. 4, this annular resilient band or ring 108 is sized to contact the mouth 24 of a container 20 of either glass or plastic and to be slightly deformed by downward pressure exerted on vacuum head 80 by a coil spring 110 that is interposed between the upper surface of vacuum head 80 and a lower surface of the outboard end 82 of each vacuum head positioning arm 56. Thus, a flexible foil sealing disk 26 that has been picked up by vacuum sealing head 80 at the sealing disk supply means 14 will be pushed by annular band or ring 108 against the mouth 24 of container 20.

Figure 4:
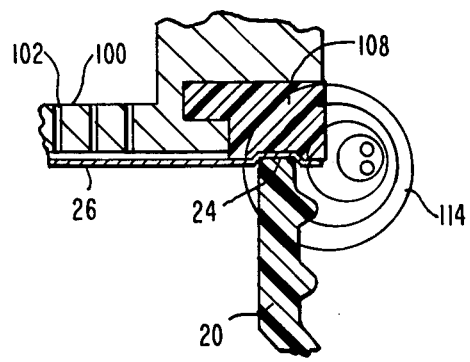
FIG. 4 is a sectional view of a portion of the vacuum head of FIG. 3 and showing the securement of a sealing disk to a container mount.

As vacuum head 80 is pushed down against mouth 24 of unsealed container 20 by downward movement of vacuum head reciprocating rod 84 due to the shape of the cam slot 90, the container and vacuum head are carried by sealer star wheel 48 through an induction sealing tunnel 112 which may be seen in FIG. 1. During the passage of the container 20 and vacuum head 80 through induction sealing tunnel 112, an induction field 114, as shown schematically in FIG. 4, is created in a known manner. This induction field 114 generates sufficient heat to activate the adhesive layer of flexible foil sealing disk 26 so that the disk will be positively sealed to mouth 24 of previously unsealed container 20. Once the container 20 and vacuum head 80 are carried out of the induction sealing tunnel 112, the vacuum on head 80 may be released and head 80 may be forced upwardly by coil spring 110 so long as cam slot follower 86 can move up in slotted cam 90. At this time, the now sealed container 22 is carried on around by sealer star wheel 48 until it is taken over by an outfeed star wheel 116 having outfeed pocket 118. Outfeed star wheel 116 is driven by an outfeed star wheel drive stub shaft 120 is concert with the two other star wheels. The sealed containers 22 are released from outfeed star wheel 116 and are taken away by a suitable outfeed conveyor 122.

Returning to FIG. 1 and also referring to FIGS. 5 and 6, the sealing disk supply means 14 will now be discussed in detail. A supply of flexible foil sealing disks 26 are either provided by a stacked seal disk supply assembly 130 of FIG. 5 or are formed by the die set disk supply assembly 132 shown in FIG. 6. In either situation, it is necessary for the continuously moving vacuum head 80 to dwell for a moment above the uppermost sealing disk 26 at supply point 14 to that the disk 26 will be properly centered on central vacuum plate 100. This is accomplished by the dwell lobe 72 and dwell recess 74 portions of lower lobed cam plate 68. By referring again to FIG. 1 it may be seen that as roller cam plate follower 64 contacts dwell lobe 72, the outboard end of vacuum head positioning cam 56 is moved more rapidly to the left. At the same time the shape of cam slot 90 in upper slotted cam disk 94 causes vacuum head reciprocating rod 84 to move down, as assisted by spring 110. Now, as roller cam plate follower 64 drops into dwell recess 74 the net effect is to hold vacuum head 80 stationary so that the uppermost sealing disk 26 will be properly aligned. Once the sealing disk 26 has been picked up by vacuum head 80, it is carried along by head 80 to its point of application to an unsealed container 20, as discussed above.

As intimated above, sealing disks 26 can either by supplied from a stack by the stacked seal disk supply assembly 130 of FIG. 5, or can be cut from a web by the die set disk supply assembly 132 of FIG. 6. In the stack supplier of FIG. 5, a stack 134 of previously formed flexible foil sealing disks are carried in a hollow tube 136 which could include a spring biased bottom support plate, not shown. Each vacuum head 80 would take the top disk from stack 134. When the tube 136 was exhausted, it could then be replaced with a fresh supply. Alternatively, as seen in FIG. 6 a punch 140 and die ring 142 could be used to sever flexible foil sealing disks 26 from a web of foil 144. A suitable web feed means 146 would be provided, as shown in FIGS. 1 and 2 to control the positioning of the web from which the flexible foil sealing disks 26 are severed.

Although not specifically discussed in detail, it will be understood that the drive means for the infeed lead screw 32, the infeed star wheel 38, the sealer star wheel 48, and the outfeed star wheel 116 will be coordinated in a generally conventional manner. Since the sealer star wheel 38 and the vacuum head drive hub 52 are both securely attached to the sealer star wheel drive sleeve 50 they stay in registration so that each vacuum head 80 is positioned above a corresponding pocket 46 in the sealer star wheel 48. In this way the continuous motion in-line sealer in accordance with the present invention remains coordinated through its complete operation.

While a preferred embodiment of a continuous motion, in-line sealer in accordance with the present invention has been set forth fully and completely hereinabove, it will be apparent to one of skill in the art that a number of changes in, for examples, the type of infeed and outfeed star wheels, the shape of the sealer star wheel, the specific composition of the flexible foil sealing disk and the like could be made without departing from the true spirit and scope of the subject invention which is accordingly to be limited only by the following claims.

What is claimed is:

1. A continuous motion, in-line sealer assembly useable to apply a flexible foil sealing disk to the mouth of a container, said sealer assembly comprising:
   an infeed means for continuously supplying containers to be sealed;
   a continuously rotatable sealer star wheel having a plurality of sealer star wheel pockets, each said sealer star wheel pocket being sized to receive a container from said infeed means;
   a reciprocable vacuum head positioned above each said sealer star wheel pocket;
   means to vertically reciprocate each said vacuum head;
   means to rotate each said vacuum head in coordination with a cooperating one of said sealer star wheel pockets;
   supply means for supplying said flexible foil sealing disks to a supply point;
   dwell means for causing each said vacuum head to dwell mometarily at said supply point;
   means for activating an adhesive layer of said sealing disk when said disk has been brought into contact with a container to be sealed; and
   outfeed means for transferring sealed containers away from said sealer assembly.

2. The continuous motion in-line sealer of claim 1, wherein said sealer star wheel is secured to a rotatable sealer star wheel drive sleeve.

3. The continuous motion in-line sealer of claim 2, wherein a vacuum head drive hub is secured to said sealer star wheel drive sleeve.

4. The continuous motion in-line sealer of claim 3, wherein said vacuum head drive hub includes a plurality of circumferentially spaced projections, and further wherein a vacuum head positioning arm is hingedly secured at a first end of each of said projections.

5. The continuous motion in-line sealer of claim 4, wherein each of said vacuum heads in reciprocably carried at a second end of a corresponding one of said vacuum head positioning arms.

6. The continuous motion in-line sealer of claim 5 wherein each of said vacuum heads is carried at a first, lower end of a vacuum head reciprocating rod.

7. The continuous motion in-line sealer of claim 6, wherein said means to vertically reciprocate each said vacuum head is a fixed upper slotted cam disk, said slotted cam disk having a cam slot, a cam slot follower carried at an upper end of said vacuum head reciprocating rod being received in said cam slot.

8. The continuous motion, in-line sealer of claim 4, wherein an offset vacuum head positioning finger is secured to an inboard end of each of said vacuum head positioning arms.

9. The continuous motion in-line sealer of claim 8, wherein each of said offset vacuum head positioning fingers carries a roller cam plate follower at a free end.

10. The continuous motion in-line sealer of claim 9, wherein each said roller cam plate follower rolls on a peripheral surface of a lower stationary lobed cam plate.

11. The continuous motion in-line sealer of claim 10, wherein said dwell means is a dwell lobe and an adjacent dwell recess on said lobed cam plate.

12. The continuous motion in-line sealer of claim 1, wherein said reciprocable vacuum head includes a central apertured lower vacuum plate in fluid communication with a plenum chamber formed within said vacuum head.

13. The continuous motion in-line sealer of claim 12, wherein a resilient band is formed as an annulus about said central apertured lower vacuum plate.

14. The continuous motion in-line sealer of claim 1, wherein said means to activate said adhesive layer is an induction sealing tunnel.

15. The continuous motion in-line sealer of claim 14, wherein each said vacuum head forces a flexible foil sealing disk against a container mouth during passage of the container and each of said vacuum heads through said induction sealing tunnel.

16. The continuous motion in-line sealer of claim 1, wherein said infeed means inclueds an infeed lead screw and an infeed star wheel, said infeed star wheel directing containers to said sealer star wheel.

17. The continuous motion in-line sealer of claim 1, wherein said outfeed means includes an outfeed star wheel which receives sealed containers from said sealer star wheel and which transfers the sealed containers to an outfeed conveyor.

18. The continuous motion in-line sealer of claim 1, wherein said supply means is a stacked seal disk supply assembly.

19. The continuous motion in-line sealer of claim 1, wherein said supply means is a die set disk supply assembly.

20. The continuous motion in-line sealer of claim 19, wherein said die set supply assembly includes a reciprocable punch and a stationary die ring.

* * * * *